United States Patent [19]

Pesch et al.

[11] Patent Number: 4,932,674
[45] Date of Patent: Jun. 12, 1990

[54] LATHE CHUCK WITH CHUCK-CLAMPING MONITOR

[75] Inventors: Karl Pesch, Dillingen/Donau; Günter H. Röhm, Heinrich-Röhm-Strasse 50, 7927 Sontheim, both of Fed. Rep. of Germany

[73] Assignee: Gunter Horst Röhm, Sontheim, Fed. Rep. of Germany

[21] Appl. No.: 228,904

[22] Filed: Aug. 4, 1988

[30] Foreign Application Priority Data

Aug. 4, 1987 [DE] Fed. Rep. of Germany ....... 3725714

[51] Int. Cl.$^5$ ............................................. B23B 31/30
[52] U.S. Cl. .......................................... 279/4; 279/111
[58] Field of Search ................... 279/4, 110, 111, 121; 82/118, 142

[56] References Cited

U.S. PATENT DOCUMENTS

| 4,447,180 | 5/1984 | Pesch | 279/4 X |
| 4,611,814 | 9/1986 | Hiestand | 279/111 |
| 4,645,220 | 2/1987 | Hiestand | 279/111 |

FOREIGN PATENT DOCUMENTS 3518332 of 0000 Fed. Rep. of Germany .

Primary Examiner—Z. R. Bilinsky
Attorney, Agent, or Firm—Herbert Dubno; Ronald Lianides

[57] ABSTRACT

An operation control device is provided for a chuck by which the rotary drive for the chuck is disengaged when the clamping motion leading to clamping of the workpiece in the chuck has not been provided or is not sufficient. The clamp jaws of the chuck are adjustable by a drive member guided axially in the chuch body which is connected to a clamping piston. The operation control device comprises a control piston which is acted on by a compressed medium against the force of a restoring spring and is locked by the drive member against the sliding caused by the compressed medium in a locked position disconnected from the rotary drive if the drive member is positioned in the end safety region of its axial displacement. Because of that, it is possible by displacement only of a control piston to control both the chuck displacement and also the clamping force for clamping the workpiece and thus to take care of the situation in which a reliable clamping of the workpiece is no longer possible at the end of the chuck displacement by a chuck interior displacement limit.

12 Claims, 2 Drawing Sheets

LATHE CHUCK WITH CHUCK-CLAMPING MONITOR

FIELD OF THE INVENTION

Our present invention relates to a lathe chuck with a chuck-clamping monitor or monitoring device.

BACKGROUND OF THE INVENTION

German open application DE-OS 31 02 099 describes a lathe chuck whose chuck body has a plurality of clamp jaws which are controlled and moved radially by a drive member movable axially in the chuck body.

The drive member has its operation monitored by an operation-monitoring device acting on the rotary drive of the lathe chuck and which at least partially forms or is connected to a clamping piston which can be acted on by a pressurized medium to move it along an axial displacement path.

The operation-monotoring device comprises a sensor fixed in position outside the chunck, a switch member positioned movable on the outer circumference of the chuck body operating the sensor and a control piston moving the switch member which is acted on by a pressurized medium of the clamping piston against the force of a restoring spring and is lockable in a locked position disengaging the rotary drive from motion caused by the pressurized medium, if the drive member is outside a certain working region of its axial displacement.

The operation-monitoring device allows a control both of the clampling displacement and also the clamping force during operation of the chuck the rotation of the chuck is only possible when the displacement of a drive member required for secure clamping of the workpiece has taken place in the chuck and the clamping pressure has built up in the clamping piston to a sufficient degree.

In the known clamping device the control piston is guided radially in the chuck body and has a lock nose for its locking on its radial interior end which is associated with a locking cam on the drive member. This design for the control piston requires large radial dimensions in connection with the restoring spring acting on it which are often undesirable. Furthermore, the fact that the position of the control piston can be influenced by centrifugal forces can be troublesome.

OBJECTS OF THE INVENTION

It is an object of our invention to provide an improved lathe chuck assembly which avoids the above mentioned disadvantages and/or difficulties.

It is also an object of our invention to provide an improved lathe chuck and operation monitor which is simply structured so that radial dimensions as small as possible are attained with the drive member positioned outside the working region while simultaneously reliably securing the control piston in the locked position.

It is another object of our invention to provide an improved chuck device in which a sensor and an associated switching member are located as far as possible to the rear in the chuck so that the operation of the sensors by the switching member can not be impeded or impaired by chips and dust arising in the machined portion of the workpieces at he front of the chuck.

SUMMARY OF THE INVENTION

These objects and others which will become more readily apparent hereinafter are attained in accordance with our invention in a lathe chuck in whose chuck body a plurality of clamp jaws are guided for displacement by a drive member movable axially in the chuck body.

The operation of the drive member is monitored by an operational control device acting on the rotary drive of the lathe and which at least partially forms or is connected to a clamping piston which can be acted on by a pressurized medium to move it along an axial displacement path.

The operation control device comprises a sensor fixed in position adjacent the chuck, a switch member positioned movably on the outer circumference of the chuck body for operating the sensor and a control piston for moving the switch member which is acted on by the pressurized medium of the clamping piston against the force of a restoring spring and is lockable in a locked position, disconnected from the rotary drive, and held against sliding caused by the pressurized medium, when the drive member is positioned outside a working region of its axial displacement.

According to our invention, the control piston slidable parallel to the axis of the chuck is coupled by a wedge drive with a radial control pin slidable in the chuck body radially to the chuck axis, with which a control cam moving with the drive member is associated as a stop, limiting a radial inward displacement of the control pin. The wedge drive is formed so that a sliding of the control piston from the locked position causes a radially inwardly directed sliding of the control pin.

The displacement of the control piston parallel to the rotation axis of the chuck enables vary small diameter structural dimensions. This eliminates the need to take into account the guiding length of the control piston in the chuck body or the length of the restoring spring.

Moreover, the motion of the control piston is no longer influenced by centrifugal forces acting on the control piston.

The control pin coupled with the control piston by the wedge drive indeed has a radial displacement as before, but is of a reduced mass so that the centrifugal forces arising in it can not act by the wedge drive on a motion of the control piston.

Furthermore, these centrifugal forces act on the control pin in the direction of its locking motion, so that in any event they can not lead to a sliding of the control piston when in the locked position and thus to a stopping of the lathe chuck or lathe, so that the operation-monitoring device can become ineffective.

Finally, the motion of the control piston parallel to the rotation axis of the chuck can be easily transmitted to the switch member in arbitrary positions axially along the chuck body so that the switch member can be correspondingly positioned at many positions along the chuck body, especially also if possible far rearwardly on the chuck body.

Also, a simple operation of the control pin is attained by the drive member because the control pin need only be in pressing contact with the control cam provided on the drive member.

In an advantageous embodiment according to our invention, the control piston and the control pin are guided under mutual constraint by the key drive. The wedge drive comprises a key cross piece inclined to the axis of the control piston and the control pin and a keyway receiving it. The key cross piece can be located in the control piston or the control pin and correspondingly the keyway can be located in the control pin and/or control piston. In each case because of the constrained guiding, the position of the control pin clearly is connected with that of the control piston so that the restoring spring provided for the control piston and acting through the wedge drive can cause the return of the control pin. Also, the control pin need not be provided with its own return spring.

According to another feature of our invention, an axially slidable control rod, axially fitting in the chuck body by which the switch member is adjustable or movable, is connected to the control piston.

Hence the legth of the control piston is not determined by the location of the switch member in the chuck. Moreover, the axial spacing between the control piston and the switch member can be spanned by a control rod of suitable length.

In particular, the switch member is appropriately a switch cam radially projecting beyond the surface of the chuck body which is guided in an axial groove of the chuck body and is connected by a slot in the groove base with the control rod.

Independently of the position of the switch member axially in the chuck body, the control piston can be located as far as possible forward in the chuck body. An advantageous embodiment provides that the control piston has a piston throat axially projecting from the front side of the chuck body in which there is an adjusting screw accessible from the front side with which the force of the restoring spring is adjustable.

According to another feature, the control piston has a longitudinal passage receiving the restoring spring, in which the restoring spring in the form of a coil spring abuts at one end against a support member slidable in the longitudinal passage against the adjusting screw, with the other end of the restoring spring; projecting from the longitudinal passage and contacting on the chuck body. The cylindrical space of the control piston acted on by the pressurized medium can be formed by an open passage in the front facing side of the chuck body in the chuck body, which is closed by a cylinder cover on the front side through which the sealed piston throat is guided. Suitably, the cylinder cover is flush with the front side of the chuck body.

The control cam can be formed by the base of a control groove running axially in the drive member and in which the control pin engages with its bolt head. The control cam can have in the vicinity of both control cam ends, radially inclined outwardly directed controlling projections whose axial length corresponds to a safety region of the axial displacemnt of the drive member which adjoins the working region and in which the control cam is held by the control pin of the control piston in the locked position thereof. The controlling projection connects appropriately by the initial inclined portions to the portion of the control cam corresponding to the working region of the drive member, lying between the controlling and projections. Corresponding initial sloping portions are provided on the head of the control pin contacting the control cam so that as a result, in a motion of the drive member from the working region into one of both safety regions, the control pin is pressed radially outwardly by the initial inclined portion from the controlling projections and thus the control piston is forced by the wedge drive into the locked position.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
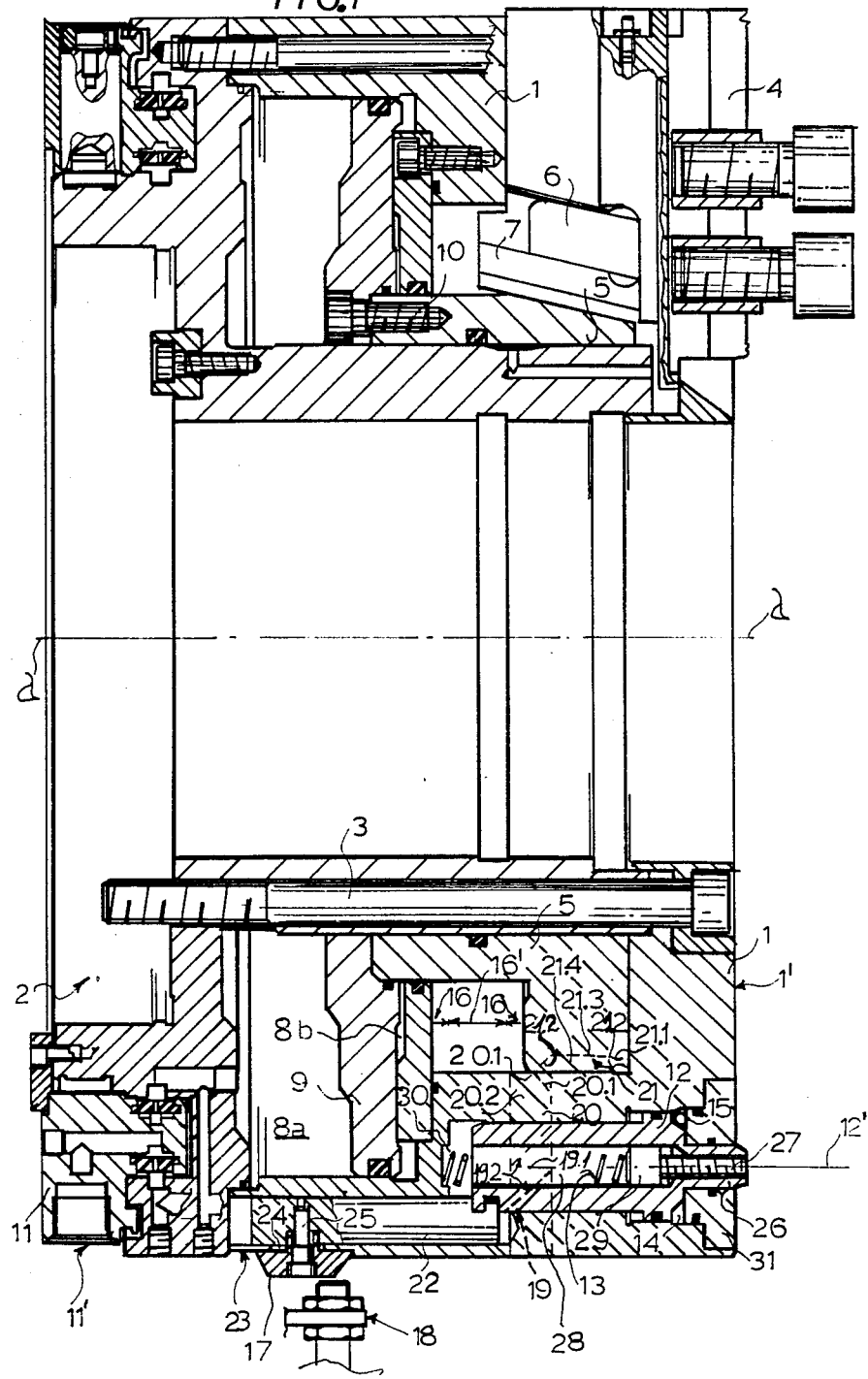
FIG. 1 is an axial cross sectional view through a chuck according to our invention.
Figure 2:
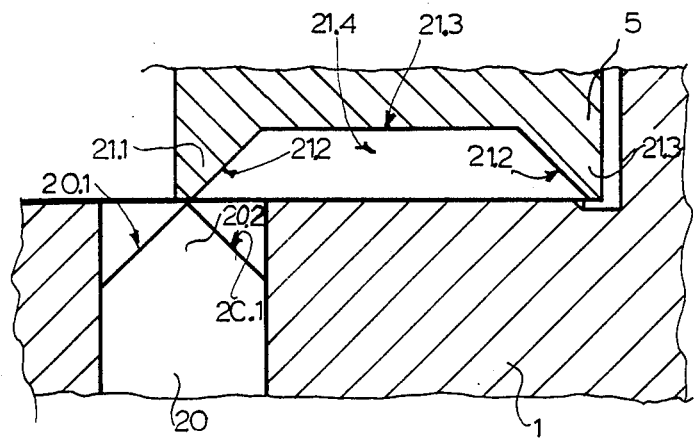
FIG. 2 is an enlarged schematic cross-sectional view, partly broken away, showing details concerning the control pin and the control cam.

The chuck shown in the drawing has a chuck body 1 which can be attached by a recess 2 with the help of a plurality of screws to the front side of a lathe spindle, not shown.

A plurality of radial chuck jaws 4 are radially guided in the chuck body 1 of which only one is shown in the drawing. For radial displacement of the chuck jaws 4 a drive member 5 slidable axially in the chuck body 1 is provided.

The drive member 5 is engaged with the clamp jaw 4 by a wedge-hook joint.

One wedge hook 6 is firmly seated on the drive member 5; the other wedge-hook 7 is firmly seated on the clamp jaw 4.

In the drawing, the drive member 5 is shown in its right end position. This corresponds to an extreme radial position of the clamp jaws 4 in the open state of the chuck for external clamping of the workpiece. If the drive member 5 moves left in the drawing, the clamp jaws 4 move radially inwardly and clamp the workpiece. The clamping displacement of the drive member 5 is thus directed to the left in the drawing. Instead of the wedge-hook coupling between the clamp jaws 4 and the drive member 5, another suitable drive joint can be used.

To move the drive member 5, a clamping piston 9 which is attached by screws 10 rigidly with the drive member 5, acts directly in a circular cylindrical space 8a, 8b of the chuck body 1. To act on the clamping piston 9 with a pressurized medium, a connecting ring 11, which remains stationary relative to the rotatable body 1 is mounted externally; thereon. The ring 11 has a connectig opening 11' for the admission and discharge of the pressurized medium, which can be fed to the cylindrical space 8b found on the right side of the clamping piston 9, so that in this case the inward clamping displacement occurs. If fed to the space 8b, the ourward; releasing displacement occurs. The conditions are reversed when, instead of external clamping, an internal clampling is required, the clamping displacement of the clamp jaws being thus directed radially outwardly.

For monitoring the clamping process, an operation-monitoring device acting on the rotary drive of the lathe is provided. It comprises a sensor 18 held fixed outside the chunck, a switch member 17 movable on the outer circumference of the chuck body for operating the sensor 18, and a control piston 12 for moving the switch member 17, axially the control piston 12 piston being acted on by the pressurized medium of the clamping piston 9 against the force of a restoring or return spring 13.

A suitable plurality of connecting ducts, indicated in the drawing only with the reference number 15, are provided between the cylindrical spaces 8a, 8b of the clamping piston 9 and the cylindrical space 14 of the control piston 12.

The control piston 12 is held in a locked position disengaging the rotary drive against the thrusting action of the pressurized medium and from this locked position, is adjustable or slidable when the drive member 5 is positioned in two safety regions on the end of its axial displacement path indicated by the arrows 16 in the drawing.

The portion of the axial displacement path corresponding to the working region of the drive member 5 is indicated by the double arrow 16'.

The control piston 12 is positioned slidable parallel to the chuck axis a and is coupled by a wedge drive 19 with a control pin 20 guided radially in the chuck body 1 slidable toward the chuck axis a.

This control pin 20 is associated with a control cam 21 movable with the drive member 5, which acts as a stop limiting the radially inwardly directed sliging motion of the control pin 20. The wedge drive 19 is thus formed so that a sliding of the control piston 12 from its locked position is connected with a radial inwardly directed sliding of the control pin 20.

The control piston 12 and the control pin 20 are guided under mutual constraint by the wedge drive 19, so that the movement of the control piston 12 and the control pin 20 are coordinated with each other.

Moreover, the wedge drive 19 comprises a cross piece key 19.1 positioned inclined to both the axis 12' of the control piston 12 and the control pin 20, and received in thereof, a keyway 19.2 which are all indicated only by dot-dashed lines in the drawing since according to the invention, the cross piece key 19.1 can be located according to choice in the control piston 12 or in the control pin 20 and conversely, the keyway 19.2 can be located in the control pin 20 and/or the control piston 12.

A control rod 22 movable axially and fitting axially in the chuck body 1 is provided by whitch member 17 is connected with the control piston 12. The switch member 17 is a switch cam radially protruding beyond the surface of the chuck body 1, which is guided in an axial groove 23 of the chuck body and which is connected with the control rod 22 by screw 25 extending through a slot 24 in the groove base. The sensor 18 is constructed in this embodiment as an inductive proximity switch which is controlled by the switch member 17 without contact.

The control piston 12 located in the front portion of the chuck body 1 has an axial piston neck 26 protruding from the front facing side 1' of the chuck body 1 which an adjusting screw 27, accessible from that front side, is located, with which the force of the restoring spring 13 is adjusted. The restoring spring 13 is positioned in a longitudinal passage 28 of the control piston 12, in which the restoring spring 13 in the form of a coil spring abuts against the adjusting screw 13, with an intervening support member 29 slidable in the longitudinal passage 28.

The other end of the restoring spring 13 projecting from the longitudinal passage 28 is braced on the chuck body 1 and the chuck body 1 is provided with a cavity or notch 30 centering the spring end. In particular, the cylindrical space 14 of the control piston 12 acted on the pressurized medium forms an open passage in the chuck body 1 extending to its front side 1' and which is closed by a cylindrical cover 31 in which the sealed piston neck 26 is guided. The cylindrical cover 31 is flush with the front side 1' of the chuck body 1.

The restoring spring 13 acts on the control piston 12 axially forwardly and the control pin 20 by the wedge drive 19 radially outwardly.

In the drawing, the control piston 12 is located 12 in the front end position which corresponds to its locking position. From this locking position the control piston 12 can move only to the left in the drawing under operation of the pressurized medium and can release the rotation drive of the machine by displacement of the control rod 22 and the shifting of the switch member 17 away from the; sensor 18, the control pin 20 being moved radially inwardly by the wedge drive 19, since it is not prevented by contact with the control cam 21 during this releasing operation.

Thus the control cam 21 in the region of both axial cam ends is provided with radially outwardly directed controlling projections 21.1 whose axial length corresponds to the safety region 16 of the axial displacement of the drive member 5. These controlling projections 21.1 connect by initial sloping portions 21.2 to the portion 21.3 of the control cam corresponding to the working region 16' of the drive member 5.

Corresponding initial sloping portions 20.1 are provided on the bolt head 20.2 of the control pin 20 contacting on the control cam 21. Thus on motion of the drive member 5 from the working region 16' to one of both safety regions 16, the control pin 20 is pressed by these initial sloping portions radially outwardly and thus the control piston 12 is forced by the wedge drive 19 axially forwardly against the force of the compressible medium into the locked position. In particular, the control cam 21 is formed by the base of a control groove 21.4 running axially on the drive member 5, in which the control pin 20 engages with its bolt head 20.2 carrying the initial sloping portions 20.1.

As a result, the operation-monitoring device causes the testing of two prerequisites for effective clamping of a work-piece, namely, whether the drive member 5 is effectively located in the working region, thus whether it has left the safety region 16, and whether the clamping pressure has reached a sufficient level.

Inasmuch as the release of the rotation drive presupposes the motion of the control piston 12 to the left in the drawing, the force exerted by the pressurized medium on the control piston 12 exceeds the oppositely directed force of the restoring spring 13. The force of the restoring spring 13 corresponds thus to a minimal clamping force associated with the chuck.

The magnitude of this minimal clamping force can be adjusted by adjustment of the corresponding restoring spring 13. The control is effected in the rotating ans stationary chuck such that the chuck is positioned in the later case only so that the switch member 17 is positioned opposite the sensor 18. If both prerequisites are fulfilled, the control piston 12 and thus also the switch member 17 are located in their axially rear end position in which the sensor 18 is not activated. The rotation drive of the lathe is released, i.e. the lathe is driven. If, however, only one of both prerequisites is fulfilled, the control piston 12 and the switch member 17 remain in their front final position illustrated in the drawing whereby the sensor 18 is activated and the idling of the lathe is caused.

The operation of this operation-monitoring device is illustrated further with several examples of deficient conditions:

If the operating pressure is low but the drive member 5 is located in a working position, the force of the restoring spring 13 adjusted to the minimum pressure prevents a sliding of the control piston 12 from the locked position.

If the operating pressure is sufficient but the drive member 5 has not left the safety region 16, the control pin 20 can not yield radially inwardly and the control piston 12 remains standing in its locked position.

Should the operating pressure be sufficient but the drive member 5 travels through the working region 16' and locates itself in the adjacent safety region 16, the control piston 12 indeed travels in a short time from the locked position axially to the rear but is immediately subsequently forced by the control cam 21 of the drive member 5 and the control pin 20 again forwardly into the locked position.

If the operating pressure falls during the rotation of the chuck, the force of the restoring spring 13 thus causes the forward travel of the control piston 12 into the locked position on exceeding the minimum pressure.

What is claimed is:

1. A lathe chuck comprising:
   a chuck body rotatable about a central axis and forming an axially extending cylinder having a front face;
   drive means for rotating said chuck body about said axis;
   a plurality of jaw members displaceable radially on said front face between radially inner and outer positions;
   a drive member axially displaceable in said chuck body between a working region and a respective safety region flanking said working region at either axial end thereof by a double-acting clamping piston operated by a pressurized medium, said drive member coacting with said jaw members for the radial displacement thereof and being further formed with a control cam corresponding to said regions;
   an operation-monitoring device for controlling said drive means, at least a part of said device being operatively connected to said clamping piston, said operation-monitoring device comprising:
   a sensor fixedly positioned outside of said chuck body adjacent a circumferential surface thereof,
   a switch member disposed on said surface and axially displaceable thereon for operating said sensor,
   a control piston disposed in said chuck body and axially displaceable therein by said pressurized medium against the force of a restoring spring provided between said control piston and the chuck body, said control piston being connected to said switch for the displacement thereof and holdable in a locked position in which said drive means is disengaged from said chuck when said drive member is positioned in a safety region, and
   a control pin radially displaceable in said chuck body and engaging said control cam which determines the radial displacement thereof, said control pin being coupled by a wedge drive to said control piston, whereby a displacement of said control piston from said locked position drives said control pin radially inwardly.

2. The chuck defined in claim 1 wherein said wedge drive includes a crosspiece key inclined to both a longitudinal axis of said control piston and said control pin and a keyway for receiving said crosspiece key, the movement of both said control piston and control pin being mutually coordinated by said wedge drive.

3. The chuck defined in claim 1, further comprising a control rod disposed in said chuck body and connected between said control piston and said switch member for the displacement thereof.

4. The chuck defined in claim 3 wherein said switch member is formed by a cam protruding radially from said circumferential surface and guided in a axial groove formed therein and connected to said control rod through an axial slot formed in said groove.

5. The chuck defined in claim 1 wherein said control piston is formed with a axial neck projecting from said front face of said chuck body and in which there is disposed an adjusting screw for regulating the force of said restoring spring.

6. The chuck defined in claim 5 wherein said control piston is formed with a longitudinal bore receiving said restoring spring which is formed as a coil, and a slidable support member disposed in said bore between on end of said spring and said adjusting screw, the other end of said spring extending from said bore and abutting said chuck body.

7. The chuck defined in claim 5 wherein a circular portion of said control piston acted on by said pressurized medium forms with a cylinder cover disposed at said front face a cylindrical passage, said axial neck being guided in said cover and sealed therewith.

8. The chuck defined in claim 7 wherein said cylinder cover lies flush with said front face of said chuck body.

9. The chuck defined in claim 1 wherein said control cam is formed by an elongated control groove extending axially in said drive member and in which said control pin engages with a bolt head formed thereon.

10. The chuck defined in claim 1 wherein said control cam is axially elongated and formed with a respective outwardly directed controlling projection at both axial ends thereof, each respective projection having an axial lenght corresponding to said safety region and which acts to hold said control pin in a position whereby said control piston is held in said locked position.

11. The chuck defined in claim 10 wherein said respective projections are joined by respective initial inclined portions to said control cam, with corresponding initial inclined portions formed on a bolt head of said control pin engaging said control cam.

12. A lathe chuck comprising:
   a chuck body rotatable about a central axis;
   drive means for rotating said chuck body about said axis;
   a plurality of clamp jaws movable radially in said chuck body;
   a drive member movable axially in said chuck body and coacting with said clamp jaws for the radial movement thereof; and
   an operation-monitoring device for controlling said drive means, at least a part of said device being operatively connected to a double-acting clamping piston operated by a pressurized medium for displacement along an axial path, said operation-monitoring device comprising:

a sensor fixedly positioned outside of said chuck body, a switch member movably disposed on an outer circumference of said chuck body for operating said sensor, said switch member being formed as a switch cam protruding radially beyond an outer surface of said chuck body and guided in an axial groove formed therein, a control piston connected to said switch member for the movement thereof, said control piston being acted on by said pressurized medium against the force of a restoring spring and is retainable in a locked position against axial sliding caused by said pressurized medium, whereby said chuck body can be disengaged from said rotary drive means when said drive member is positioned outside of a working region of the axial displacement thereof, a radially disposed control pin radially slidable in said chuck body toward said central axis, a wedge drive coupling said control piston with said control pin, said wedge drive being formed so that a sliding movement of said control piston from said locked position drives said control pin radially inwardly, said wedge drive being formed by a crosspiece key inclined to both a longitudinal axis of said control piston and said control pin and a keyway for receiving said crosspiece key, the movement of both said control piston and said control pin being mutually coordinated by said wedge drive, a control cam on said drive member formed by an axially extending control groove engaged by a bolt head formed on said control pin, said control cam acting as a stop for limiting the inward radial displacement of said control pin, a control rod connected between said control piston and said switch member for the axial displacement thereof, said switch member being connected to said control rod through an axial slot formed in said axial groove, an adjusting screw for regulating the force of said restoring spring is disposed in an axial neck of said control piston and projects from a front facing side of said chuck body for providing unobstructed access thereto, a longitudinal passage formed in said control piston for receiving said restoring spring which is formed as a coil, a slidable support member being disposed in said passage between one end of said spring and said adjusting screw, the other end of said spring extending from said passage and abutting said chuck body, and a cylinder cover provided at said front side flush with a surface thereof, said cover forming with a circular portion od said control piston acted on by said pressurized medium a cylindrical chamber, said axial neck being guided in said cover and sealed therewith.

* * * * *